United States Patent
Wijk et al.

[11] Patent Number: 5,995,836
[45] Date of Patent: Nov. 30, 1999

[54] METHOD AND SYSTEM FOR VARIABLE HANDOFF HYSTERESIS IN A RADIOCOMMUNICATION SYSTEM

[75] Inventors: Per Wijk, Göteborg; Peter Nordlund, Bromma; Thomas Lundborg, Stockholm, all of Sweden

[73] Assignee: Telefonaktiebolaget LM Ericsson, Stockholm, Sweden

[21] Appl. No.: 08/997,998

[22] Filed: Dec. 24, 1997

[51] Int. Cl.⁶ .................................................. H04Q 7/20
[52] U.S. Cl. ........................... 455/436; 455/437; 455/525
[58] Field of Search .................................... 455/436, 437, 455/438, 439, 440, 517, 525, 67.1, 441, 422, 432; 370/280, 281, 319, 320, 321, 335, 337

[56] References Cited

U.S. PATENT DOCUMENTS

| | | | |
|---|---|---|---|
| 5,239,667 | 8/1993 | Kanai | 455/10 |
| 5,379,446 | 1/1995 | Murase | 455/33.2 |
| 5,678,185 | 10/1997 | Chia | 455/436 X |
| 5,701,585 | 12/1997 | Kallin et al. | 455/437 |
| 5,722,072 | 2/1998 | Crichton et al. | 455/437 |
| 5,722,073 | 2/1998 | Wallstedt et al. | 455/437 |
| 5,774,809 | 6/1998 | Tuutijarvi et al. | 455/436 X |

FOREIGN PATENT DOCUMENTS

| | | |
|---|---|---|
| 0 631 451 | 12/1994 | European Pat. Off. . |
| 685974 | 12/1995 | European Pat. Off. . |

*Primary Examiner*—Wellington Chin
*Assistant Examiner*—Yemane Woldetatios
*Attorney, Agent, or Firm*—Burns, Doane, Swecker & Mathis, L.L.P.

[57] ABSTRACT

A method and system for performing handoffs in radiocommunication systems using a time variable hysteresis value are described. By varying the hysteresis value in accordance with the amount of time that the mobile station has been using a current channel, problems associated with the measurement of signal strengths attributable to filter initialization can be avoided.

19 Claims, 3 Drawing Sheets

Fig. 4

| # OF CQM REPORTS | Hyst (t) |
|---|---|
| 1 | 2 dB |
| 2 | 1.8 dB |
| 3 | 1.65 dB |
| . | . |
| . | . |
| . | . |
| N | 1 dB |

METHOD AND SYSTEM FOR VARIABLE HANDOFF HYSTERESIS IN A RADIOCOMMUNICATION SYSTEM

BACKGROUND

The present invention relates generally to methods and systems for radiocommunications and, more particularly, to such systems in which a connection can be handed over from one channel or base station to another.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

In cellular systems, the capability is typically provided to transfer handling of a connection between, for example, a mobile station and a base station to another base station, as the mobile station changes its position and so moves out of the coverage area of one base station and into the coverage area of another base station. This type of handoff is commonly referred to as an "intercell" handoff as the coverage areas associated with base stations are commonly referred to as "cells". Depending upon the quality of the current channel, it may also be desirable to transfer a connection from one channel of the base station to another channel supported by the same base station, which handoffs are commonly referred to as "intracell" handoffs.

To smoothly complete a handoff, the network controlling the base stations first determines, for each mobile station, whether the need for handoff is imminent and secondly determines to which new base station (or channel) handoff should be effected. In making the latter decision it is desirable that the network controller know either how well each base station can receive signals from a mobile station in question, how well the mobile station in question can receive signals from each base station, or both.

Many existing radiocommunication systems are based on an access method known as Frequency Division Multiple Access (FDMA), in which each mobile station transmits on a unique frequency within its current base station area. The mobile station is thus unaware of signals on other frequencies from surrounding base stations. In FDMA systems it is typically considered too costly to equip mobile stations with an extra receiver that could be used to scan other base station frequencies. Instead, it is common for base stations to be equipped with a scanning receiver that searches for the signals of approaching mobile stations. The network then hands over a mobile station from a base station covering an area that the mobile is leaving to the base station that reports the best reception of the mobile station's signal.

More recent cellular telephone standards employ Time Division Multiple Access (TDMA) in which a fixed time period (e.g., 20 mS) on each pair of radio frequency links (one used in the direction from mobile station to base station (uplink), the other used in the direction from base station to mobile station (downlink)) is divided into a number (e.g., 3) of short timeslots (e.g., 6.6 mS) that are cyclically used by different mobile stations. Thus, a first mobile station transmits in the first timeslot in each period, a second mobile station transmits in the second timeslot in each period and so on. Likewise the base station transmits to one mobile station in the first timeslot, another mobile station in the second slot and so on. By offsetting the allocation of timeslots in the two communication directions, base to mobile (the downlink) and mobile to base (the uplink), it can be arranged that a first mobile transmits in the first timeslot and receives in the second timeslot; a second mobile transmits in the second timeslot and receives in the third, while a third mobile transmits in the third timeslot and receives in the first timeslot. An advantage of this arrangement is that a mobile station does not need to transmit and receive simultaneously, which reduces disturbance.

In the above three-timeslot example, each mobile station is active to transmit or receive in two of the three timeslots and is idle in the remaining timeslot. Therefore it is possible for TDMA mobile stations to use this idle time to receive signals from other base stations and measure their signal strength. By reporting these signal strength measurements to the base station using a slow speed data channel multiplexed with the traffic (i.e., voice), the network is informed about the base stations each mobile station can receive. The network can use this information to effect handoff to the best base station, and such a method is termed mobile assisted handover (MAHO). When the base stations scan for the signal strength of mobile stations, the method could be termed base assisted handover (BAHO). Systems providing MAHO also have access to the base station measurements, and so are able to effect smoother and more reliable handovers because both uplink and downlink signal strengths are taken into account, instead of just uplink strengths in the case of BAHO.

In yet another access technique, Code Division Multiple Access (CDMA), mobile stations can share the same frequency band but communications are distinguishable by virtue of unique spreading codes. Even in CDMA systems it is possible to measure a signal strength of pilot channels associated with a particular base station. The base station and/or mobile station can use this information to determine when a handover to another code, or another frequency band in multicarrier CDMA, is desirable.

As can be seen from the foregoing, a common element in determining when an handoff is desirable is the measurement of signal quality received either at the base station, at the mobile station, or both. An intracell handoff, on the other hand, is triggered by insufficient quality of the current connection as indicated by, e.g., bit error rate (BER). Conventionally, the decision to make a handoff is based on this signal quality information in view of some constant hysteresis value. Signal quality can be expressed as either, for example, signal strength or BER. If, for example, the signal strength received by a mobile station from an adjacent cell's base station exceeds that of the base station to which it is currently connected plus the constant hysteresis value, then a handoff occurs to the adjacent cell's base station. By providing the hysteresis value, it was conventionally thought that inadvertent handoffs due to fluctuations in signal strength could be minimized so that a mobile station operating near cell borders didn't experience a "ping-pong" effect between base stations.

However, the provision of a constant hysteresis has been found by Applicants to be ineffective under certain circumstances. In particular, base stations filter the reported signal quality in order to more accurately determine when a handoff is desirable for a particular mobile station under the particular rf conditions that its channel is experiencing. This filter can be initialized either by assuming a fixed value or, for example, by using the first received value from the mobile station. If the first received value from the mobile station is used as a "best guess" to initialize the filter, then the filter will more rapidly converge on a correct value. However, during the convergence process, fluctuations in the signal quality may result in undesirable handoffs.

Accordingly, there is a need to develop enhanced techniques to determine when a handoff is appropriate to efficiently utilize system resources, to avoid oscillating connections caused by the "ping-pong" effect described above and to address the undesirable handoffs caused during the period when receive filters are being initialized.

SUMMARY

These, and other, problems, drawbacks, and limitations of conventional handoff techniques, are overcome according to the present invention in which the hysteresis level used in determining whether a handoff is desirable is varied over time. More specifically, instead of using a constant hysteresis, the hysteresis used immediately after a connection has been set-up, either after a handoff has been made or after call set-up, is initially set to a higher level. Then, after a predetermined period of time, or after a predetermined number of samples have been received by the mobile station over the recently established connection, the hysteresis value can be decreased to a steady state value. The decline in hysteresis can be stepped or gradual.

In this way, undesirable handoffs which might otherwise occur shortly after connections are established, e.g., due to filter initialization, are prevented. Moreover, the usage of unnecessarily high, constant hysteresis levels, which would solve the problem of filter initialization at the expense of failing to make needed handoffs at other times, is also avoided.

BRIEF DESCRIPTION OF THE DRAWINGS

The foregoing, and other, objects, features and advantages of the present invention will be more readily understood upon reading the following detailed description in conjunction with the drawings in which:

FIG. 4 is an illustration of a look-up table which can be used to determine a value of the time variant hysteresis according to the present invention.

DETAILED DESCRIPTION

In the following description, for purposes of explanation and not limitation, specific details are set forth, such as particular circuits, circuit components, techniques, etc. in order to provide a thorough understanding of the invention. For example, various details are provided relating to exemplary modulation and transmitting techniques. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary details. For example, although the following description is scripted in the context of inter-cell handoff determinations, those skilled in the art will readily appreciate that the present invention is equally applicable to intracell handoff determinations.

Figure 1:
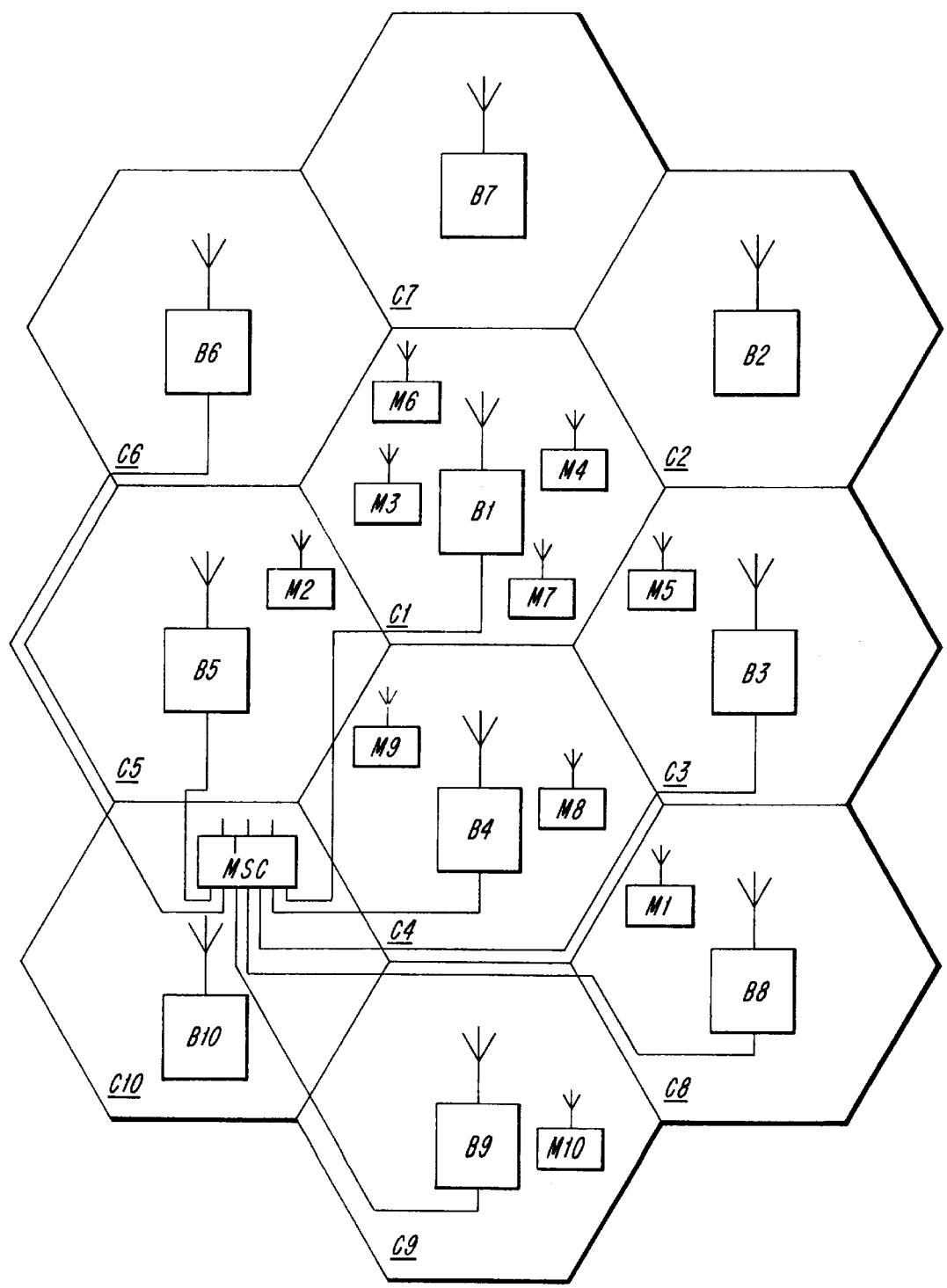
FIG. 1 illustrates an exemplary cellular radiocommunication system.

Prior to describing the details of the present invention, an example of the construction of a cellular mobile radio system in which the present invention can be used is illustrated in FIG. 1. FIG. 1 is a schematic diagram illustrating ten cells, C1 to C10. Normally, systems and methods according to the present invention would be implemented in a system comprising many more cells than ten. For the purposes of this description, however, the system depicted in FIG. 1 is considered to be an isolated region of a larger system.

For each cell C1 to C10, there is a respective base station B1 to B10. The exemplary embodiment illustrated in FIG. 1 shows base stations situated in the vicinity of respective cell centers and having omni-directional antennas. Those skilled in the art will readily appreciate that the base stations may be located in other areas of the cells and have other types of antennas, for example, in the vicinity of cell borders and having directional sector antennas.

FIG. 1 also illustrates ten mobile stations M1 to M10, which are movable within a cell and from one cell to another cell. Again, methods and systems according to the present invention can be practiced with more or less than ten mobile stations.

Also illustrated in FIG. 1 is a mobile switching center (MSC). The MSC is connected to all ten base stations by cables (not all shown) and to a fixed public switching telephone network (PSTN) or similar network. The MSC routes calls to and from the base stations and coordinates the activities of the system.

Cellular systems are assigned to a particular frequency band over which they can operate. This frequency band is allocated in units called channels to the cells in a particular area. As discussed above, the efficient use of the frequency spectrum is an important consideration in maximizing system capacity. Thus, it is not surprising that a number of different methodologies have been adopted for allocating channels to the various cells and, more particularly, to assigning a channel for new connections occurring within each cell. Some of these methodologies allocate fixed sets of channels to each cell, while others allocate channels dynamically based on traffic densities and/or interference situations. In all of these methodologies, however, the system generally provides the capability to change channels when signal quality degrades to an unacceptable degree.

For example, the system may determine that a handoff is needed based on periodic measurements of signal strength (and possibly other connection parameters) associated with the connection between the mobile station and its current, serving base station. These measurements are typically reported to the system periodically by way of channel quality measurements (CQMs) transmitted by the mobile station to the base station.

In one exemplary embodiment handoff decisions are made based on downlink signal strength of the serving ($SS_{SERV}$) and the target ($SS_{TARG}$) base stations as measured by the mobile station and reported to the land system, for example using the conventional Mobile Assisted Handoff (MAHO) function. Using the MAHO function, a mobile station may be ordered by the system to measure and report signal strength (and possibly other) parameters associated with the signal transmitted by the base station to which it is connected, as well as one or more target (also referred to as "candidate") base stations.

Figure 2:
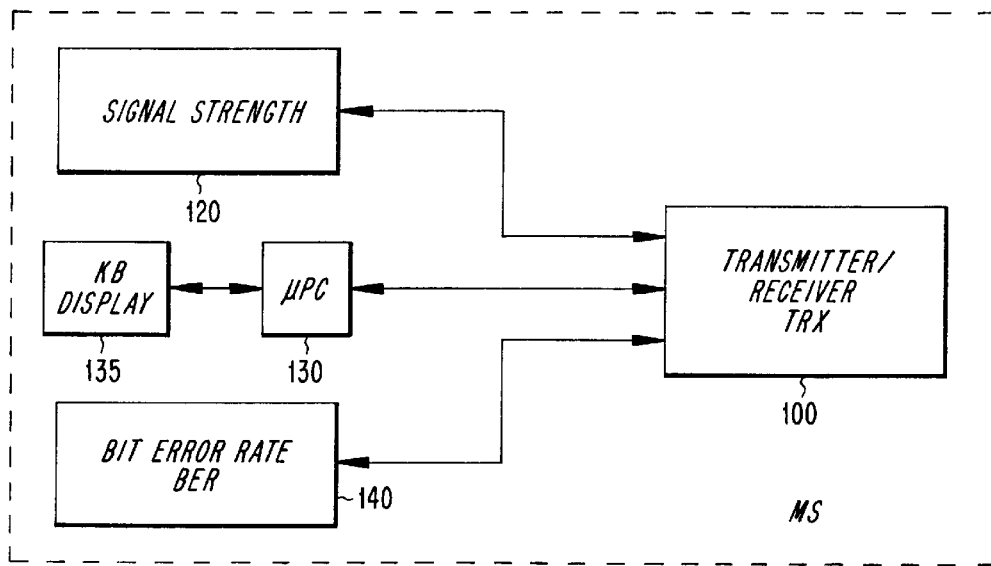
FIG. 2 is a block diagram representation of an exemplary mobile station which can be used to implement the present invention.

An exemplary embodiment of a mobile station which can operate to perform MAHO measurements is illustrated in FIG. 2. This block diagram has been simplified to illustrate only those components relevant to the measurement of downlink signal strength, however those skilled in the art will be well aware of the other major functional blocks associated with mobile stations. In FIG. 2, incoming radio signals are received by transmitter/receiver TRX 100. The timing is synchronized to the received symbol sequence by microprocessor controller 130. The strength of the received signals are measured by a signal strength measuring part 120, the value of which is then passed to microprocessor controller 130. The bit error rate (BER) of the received signal can also be determined as an indication of received signal quality as reflected by block 130. This measurement of received signal quality is particularly relevant in determining when an intracell handoff is desirable. The mobile station will also have input/output devices, such as a keyboard and display 135, as well as a microphone and speaker unit (not shown), which enables information to be exchanged between the mobile station and the base station.

When the mobile station receives a list of channel numbers and/or frequencies in a MAHO command, it will sequentially tune to each identified channel/frequency during one or more measurement intervals. For example, in a TDMA system the measurement intervals may be provided during idle time slots, i.e., during time slots when the mobile station is not transmitting or receiving over its currently assigned traffic channel. Once the mobile station has made the requested measurements, it will report them to the system which will then evaluate the various target base stations using a handoff algorithm. Although simplified for the purposes of better illustrating the present invention, handoff algorithms according to the present invention can be represented as:

$$SS_{TARG} > SS_{SERV} + \text{Hyst}(t)$$

where:

Hyst(t) is a time variable hysteresis value which is added to the signal strength of the serving base station to avoid oscillating handoffs. When the inequality is true, then a handoff is justified to the target base station. Otherwise, the system evaluates any other target base stations or maintains the current connection. Of course those skilled in the art will appreciate that other factors, e.g., service availability, macro/microcell preference, etc. may also be considered in the handoff algorithm.

As mentioned above, the hysteresis value according to the present invention can vary over time to compensate for inaccuracies in the signal strength measurements attributable, at least in part, to the operation of the filtering process in the base station. The hysteresis value is made time variant based upon a duration of the current connection and/or the number of channel quality measurement reports reported to the system by the mobile station regarding its current connection. More specifically, immediately after the mobile station has established a connection, i.e, via call-setup or handoff, the time variant hysteresis value will be set to a first, relatively high level (e.g., 2 dB). At a second time, after the filter coefficients have been properly initialized, the time variant hysteresis value will be set to a second, steady-state level, which is lower than the first level (e.g., 1 dB). This steady-state hysteresis level will be maintained until such time as the connection is ended or handed off.

The time variable hysteresis can approach the steady-state level in a stepwise fashion, and may thus be viewed as a temporary add-on to the steady-state hysteresis. For example, suppose that the first hysteresis value is set to the steady state hysteresis, e.g., 3 dB, with an add-on of, e.g., 2 dB. The add-on may first decay to 1 dB and then to 0 dB in, for example, four seconds. The hysteresis is then maintained at 3 dB until the next handoff or until the connection is ended.

Figure 3:
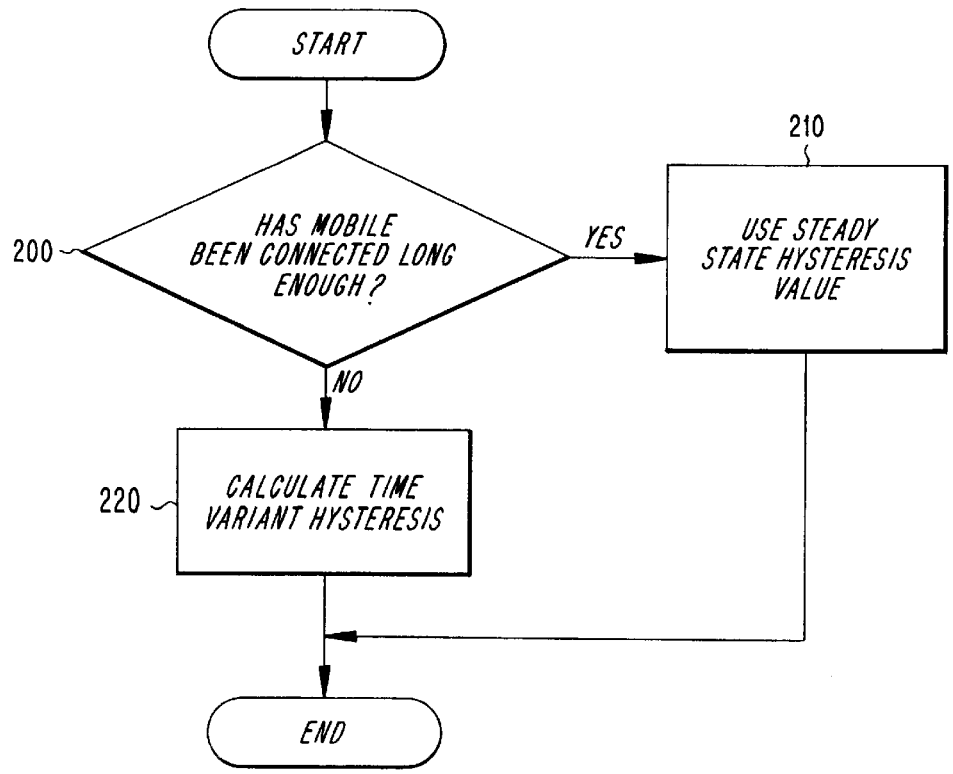
FIG. 3 is a flow chart for determining a value of the hysteresis to be used for handoffs according to an exemplary embodiment of the present invention.

Thus, handoff algorithms according to the present invention can apply a time variable hysteresis value as summarized by the flowchart of FIG. 3. Therein, it is first determined, at block 200 whether the mobile station has been connected (using a current channel) long enough (e.g., 4 seconds) for the base station filter to be properly initialized. If so, then the steady-state hysteresis level can be used in the handoff determination at step 210. Otherwise, the hysteresis value is calculated at block 220, which calculation can be performed in a variety of ways using the values of the received samples and the number of received samples.

For example, the time variant hysteresis may be determined based upon the number of CQM reports received from the mobile station regarding its current channel. This is illustrated by the table of FIG. 4, wherein the listed hysteresis values are purely exemplary. As can be seen from the Figure, the values decrease as more CQM reports are received, i.e., as the filter in the base station adapts to a greater number of received signal samples during initialization. After some predetermined number N of CQM reports, the time variant hysteresis will reach the steady-state value, in this example 1 dB. Those skilled in the art will appreciate that this table can, for example, be implemented as a look-up function in memory.

Those skilled in the art will appreciate that the foregoing techniques can be used to improve handoff determinations in a variety of ways. For example, in any situation wherein the base station's filtering is initialized based upon a first received signal quality report (e.g., signal strength or BER), these techniques can be used to reduce the uncertainties involved in the initialization.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for handing over a connection between a serving base station and a remote unit to a candidate base station comprising the steps of:

measuring a first received signal quality associated with said connection between said serving base station and said remote unit;

measuring a second received signal quality associated with a possible connection between said candidate base station and said remote unit;

determining whether a handoff is appropriate by comparing said second received signal quality to said first received signal quality as modified by a variable hysteresis, a value of said variable hysteresis being based on a parameter associated with a duration of said connection between said serving base station and said remote unit, wherein said parameter is a number of channel quality measurement reports having been evaluated for said connection between said serving base station and said remote unit; and selectively handing over said connection based upon a result of said determining step.

2. The method of claim 1, wherein said first and second received signal qualities are signal strengths.

3. The method of claim 1, wherein said first and second received signal qualities are bit error rates.

4. The method of claim 1, wherein said duration of said connection is measured from a previous handoff.

5. The method of claim 1,
wherein said time variable hysteresis value is determined by using a look-up table as indexed by said number of channel quality measurements received by said system.

6. The method of claim 1, further comprising the step of:
varying said hysteresis value gradually between a first value and a second value.

7. The method of claim 1, further comprising the step of:
varying said hysteresis value as a step function between a first value and a second value.

8. A radiocommunication system comprising:
a receiver for receiving signal quality measurements reported by a mobile station; and
a processor for determining whether a handoff is desirable for said mobile station based upon a comparison between a first signal quality measurement and a second signal quality measurement modified by a time variable hysteresis value, said time variable hysteresis value being determined based on a parameter associated with said mobile station's connection to said system using a current channel,
wherein said parameter is a number of channel quality measurement reports having been evaluated for said connection.

9. The radiocommunication system of claim 8, wherein said signal quality reports include signal strength measurements.

10. The radiocommunication system of claim 8, wherein said signal quality reports include bit error rate measurements.

11. The radiocommunication system of claim 8, wherein said time variable hysteresis value is determined by using a look-up table as indexed by said number of channel quality measurements received by said system.

12. The radiocommunication system of claim 8, wherein said time variable hysteresis value varies gradually between a first value and a second value.

13. The radiocommunication system of claim 8, wherein said time variable hysteresis value varies as a step function between a first value and a second value.

14. A method for determining whether a handoff is desirable in a radiocommunication system comprising the steps of:
receiving signal quality measurements reported by a mobile station; and
determining whether a handoff is desirable for said mobile station based upon a comparison between a first signal quality measurement and a second signal quality measurement modified by a time variable hysteresis value, said time variable hysteresis value being determined based on a parameter associated with said mobile station's connection to said system using a current channel, wherein said parameter is a number of channel quality measurement reports having been evaluated for said connection.

15. The method of claim 14, wherein said signal quality reports include signal strength measurements.

16. The method of claim 14, wherein said signal quality reports include bit error rate measurements.

17. The method of claim 14, wherein said time variable hysteresis value is determined by using a look-up table as indexed by said number of channel quality measurements received by said system.

18. The method of claim 14, wherein said time variable hysteresis value varies gradually between a first value and a second value.

19. The method of claim 14, wherein said time variable hysteresis value varies as a step function between a first value and a second value.

* * * * *